United States Patent
Tyckowski

(10) Patent No.: US 6,249,732 B1
(45) Date of Patent: Jun. 19, 2001

(54) WINDOW CHARACTERISTIC MAPPING FOR OBJECT DETECTION

(75) Inventor: Joseph Tyckowski, Clawson, MI (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/596,261

(22) Filed: Jun. 16, 2000

(51) Int. Cl.[7] .................. G05D 3/00; E05F 15/00
(52) U.S. Cl. ............ 701/49; 701/53; 340/853.2; 307/10.1
(58) Field of Search .................. 701/49, 53, 36; 340/853.2; 307/10.1, 9.1

(56) References Cited

U.S. PATENT DOCUMENTS

| | | | | |
|---|---|---|---|---|
| 4,733,145 | * | 3/1988 | Ohashi et al. | 318/54 |
| 5,248,897 | * | 9/1993 | Lee | 307/10.1 |
| 5,291,103 | * | 3/1994 | Ahmed et al. | 318/3 |
| 5,329,163 | * | 7/1994 | Satoh et al. | 307/10.1 |
| 5,331,260 | * | 7/1994 | Ahmed | 318/282 |
| 5,537,013 | * | 7/1996 | Toyozumi et al. | 318/283 |
| 5,621,290 | * | 4/1997 | Heller et al. | . |
| 5,723,959 | * | 3/1998 | Iwata et al. | 318/447 |
| 5,731,675 | * | 3/1998 | McCarthy | 318/469 |
| 5,773,942 | * | 6/1998 | Takahara et al. | 318/280 |
| 5,949,207 | * | 9/1999 | Luebke et al. | 318/446 |
| 6,031,296 | * | 2/2000 | Takagi et al. | 307/10.1 |
| 6,031,348 | * | 2/2000 | Fehr et al. | 318/283 |
| 6,060,794 | * | 5/2000 | Takagi et al. | 307/125 |
| 6,064,165 | * | 5/2000 | Boisvert et al. | 318/465 |
| 6,081,085 | * | 6/2000 | Ohashi et al. | 318/283 |
| 6,097,105 | * | 8/2000 | Oikawa | 307/10.1 |
| 6,111,373 | * | 8/2000 | Ohashi | 318/265 |
| 6,166,508 | * | 12/2000 | Kalb | 318/632 |

* cited by examiner

Primary Examiner—William A. Cuchlinski, Jr.
Assistant Examiner—Olga Hernandez
(74) Attorney, Agent, or Firm—Carlson, Gaskey & Olds

(57) ABSTRACT

The predicted value of a window characteristic during closure is divided into a plurality of discrete segments. The actual system response during a closure without obstruction is then read for each of said discrete segments. A correction value to move away from the predicted value is then set for each of the discrete segments. The correction value is stored in digital form, and utilized to modify the predicted value. The present invention thus fine tunes the predicted value to account to the individual response of the particular system. In this way, the number of false or delayed obstruction readings are reduced compared to the prior art.

8 Claims, 1 Drawing Sheet

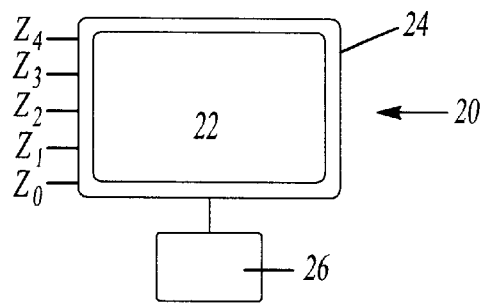
*Fig-1*
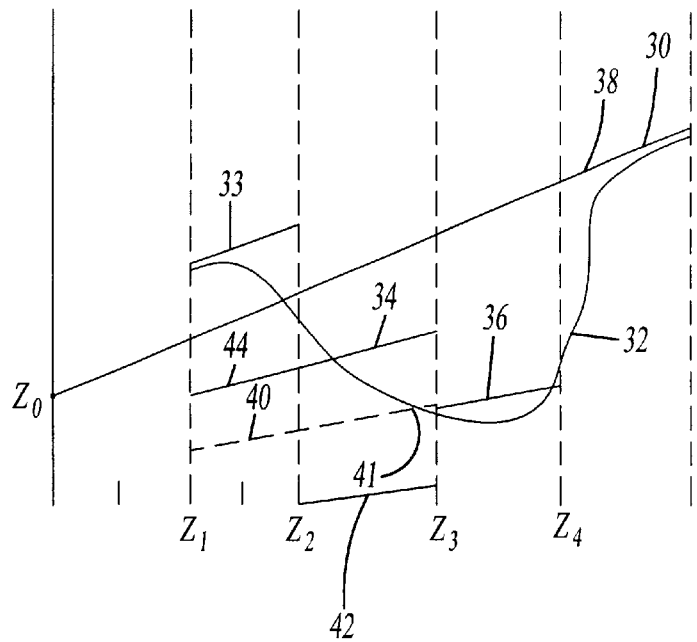
*Fig-2*
*Fig-3*

WINDOW CHARACTERISTIC MAPPING FOR OBJECT DETECTION

BACKGROUND OF THE INVENTION

This invention relates to mapping a response to window movement over the movement range of the window such that an object detection system is better adapted to the individual window.

Windows are utilized in vehicle applications to close openings to the vehicle cabs. The term "window" as utilized in this application extends to any vehicle closures such as side windows, sunroofs or moonroofs, etc. The moveable closure in these systems is controlled by a closure button selectively actuated by the vehicle operator. When the closure is moving to its closed position, there may sometimes be an obstruction in the closure path. As an example, a passenger's arm could be in the path.

The prior art has monitored characteristics such as motor torque or speed, and identified the presence of an object in the path of the closure by looking for a deviation from an expected value for the characteristic. These systems typically predict the characteristic value, and then set a limit spaced from that predicted value. An obstruction is expected to cause the characteristic value to exceed the limit. Thus, if the measured characteristic exceeds the limit, an obstruction is identified. Such systems will typically stop or reverse a motor for closing the closure if an obstruction is identified.

However, these systems may sometimes be imprecise since the actual window system could have characteristics that vary from the predicted value. That is, it is quite difficult to predict a value that would be true for all of the individual characteristics that will exist for a particular window system. Manufacturing tolerances for the dozens of associate components could affect the values. If the actual system differs from the predicted system, then "false" obstruction readings, or missed obstructions, could occur.

Thus, it would be valuable to measure the actual value of the characteristic during closure of the window, and store those actual values as the "predicted value." The limits can then be set relative to this predicted value.

However, such a system would require an undue amount of data storage space.

SUMMARY OF THE INVENTION

The disclosed invention starts with a predicted value based on some function. A control then monitors the actual value at discrete positions, and "maps" a correction value for the predicted value at each discrete position to approximate the monitored value over each of the positions. The system then stores in digital form the correction value for each discrete position. The predicted value is then changed, or corrected, for each discrete position. The same technique can be used to correct the limit instead of the predicted value. The above system only requires a minimal amount of storage, and can thus be practically realized. All that must be stored is the correction value, which can be coded digitally in a few bits of space. Although position requirements are disclosed, time segments could be utilized.

These and other features of the present invention will be best understood from the following specification and drawings, the following of which is a brief description.

BRIEF DESCRIPTION OF THE DRAWINGS

FIG. 1 is a schematic view of a window system.

FIG. 2 graphically shows the inventive mapping of a predicted value.

FIG. 3 is a view of the stored data for the FIG. 2 system.

DETAILED DESCRIPTION OF A PREFERRED EMBODIMENT

A window system 20 moves a closure 22 within a window frame 24. A motor 26 is shown schematically driving the window 22. As shown, the movement could be separated into segments $Z_1$–$Z_4$. The segments could be time based or position based.

FIG. 2 graphically shows a characteristic, here speed, over a number of discrete points during the movement of the closure 22. The discrete points can be time based or position based. A value 30 shows a predicted value as a base linear function. While FIG. 2 shows speed, the present invention is equally applicable to monitoring current, torque or other characteristics which could be indicative of an obstruction in the path of the closure 22.

The present invention utilizes the following equation to reach a corrected predicted value at any point Z along the movement of the closure 22:

$$F(Z)=F+F_p \times Z+M(Z) \times Y$$

The $F_0$ is the value at position zero, or where the line 30 would cross the zero point. The function $F_p$ is a function which predicts the value of the characteristic in an ideal situation. Y is a scaler to correlate a unit value of M(Z), the map, to the predicted value. It is this unit value that the present invention uses to "correct" and to tailor the value F(Z) to the individual system.

The present invention recognizes that the actual system response without obstruction differs from the predicted value 30. The present invention thus seeks to correct and use a new predicted value that accounts for the actual deviation of response from prediction 30. A sample response is shown at 32. In the time Z1, it can be seen that the response 32 is actually somewhat over the predicted value 30. An estimated correction value 33 can be "mapped" to this section of the response 32. The response 32 then quickly drops below the line 30, and a correction value 34 can be mapped to the position Z2. A correction value 36 is mapped to the portion of response 32 over position interval Z3. As can be seen, this portion of response 32 is well below the predicted response 30. The response 32 then moves upwardly toward a section 38 of the predicted response 30 in position interval Z4. It could be said that during position interval Z1, the corrected response 33 is above the predicted value 30 by one unit. It is only the correction value (i.e., one unit) which need be stored. The corrected response 34 is placed one unit below the predicted value 30 at position interval Z2. The corrected response 36 is approximately two units below the predicted value 30 at position interval Z3. The corrected response 38 is at the predicted value 30 for the position interval Z4. The amount of actual deviation corresponding to a "unit" compared to the value of the predicted amount 30 is utilized to reach the scaler value Y in the above equation. Y is then multiplied by the number of "units" for each correction at response segments 32, 34, 36 and 38. The corrected response can be easily reached by looking at response 32 over the segments and finding a value which is a "best fit". A simple control can easily and quickly perform the best fit operation.

By simply utilizing a digital code at each of the sections Z1, Z2, Z3 and Z4, the present invention is able to identify four variations from the predicted value 30, which can be used to correct the predicted value. FIG. 3 shows four distinct digital codes for the four unit values to correct from the level 30. It should be understood, that any one of these four codes could be utilized at more than one position interval, if that were the unit value that would best map a correction to fit the actual response 32.

The present invention allows tailoring expected values to the individual window unit, as follows. The typical object detection system sets a limit, such as limit 40, spaced by a predetermined amount from the predicted value 30. Again, it should be understood that while the present invention shows a predicted value 30 as a simplified linear amount, in some cases, this predicted amount may be much more complex. However, in general, some limit is set from a predicted value. The present invention moves the predicted value to account for the real world response. As shown over segment Z2, the actual system response 32 crosses the limit 40 at point 41. In this instance, an obstruction would be identified, even though no such obstruction would in fact be in the way.

The present invention, having mapped a correction for segment Z2 to account for one unit of downward correction (see 34), moves the actual limit to 42 one "unit" downwardly from the limit 40. As can be seen, no false hit will be read.

The present invention moves the limit in one of two ways. The limit could be what is actually corrected by the mapped value for the section. In such a case, the corrected units are used to move the limit. Alternatively, the limit can simply be set to be a predetermined amount from the corrected predicted value. At any rate, with the limit 42 moved downwardly from the nominal limit 40, the normal system response 32 does not identify an obstruction over segment Z2.

Similarly, the value of the limit 44 in the position interval Z1 is moved upwardly one unit from the nominal limit 40. Again, this accounts for the actual real world response of the system in the Z1 position interval. An actual obstruction would be identified more quickly with this arrangement.

The mapped correction values are initially identified by monitoring the first few movements of the closure member. As an example, when a closure member is initially moved to a closed position, the control may monitor the values, and utilize those values as the response 32. The control may assume that the first few movements of the window will not be likely to encounter an obstruction. Alternatively, the control may look to monitor values which are between the initially set limits and the predicted value, and use monitored values between the limits and the predicted value as a system response 32. In a similar fashion, over time the response 32, and the corresponding mapped values can be changed if the system dynamics change. Again, if the control monitors a response 32 which is between the previous response 32 and a limit, the control can update the mapped correction values.

With the present invention as shown in FIG. 3, one byte is utilized and two bits are used for each region. Thus, there are four different regions with four possible values. Of course, the present invention would also allow an increased number of regions to be assigned.

To access the table in FIG. 3, the control preferably utilizes a position counter divided by the range of each region. An integer result is used as a shift index to sort through the table. The required coded value is obtained by shifting the map table, and utilizing an appropriate mask. The map may be held in RAM.

The mapping may be learned, or modified. One method of adjusting the mapped value would be to utilize an intermediate limit or threshold between the limit and the predicted value. Crossing this intermediate threshold would be identified as an "excessive deviation" and would thus cause a unit value to be mapped for the particular segment. Such a deviation could be recorded as a temporary map variable which may either be saved as a new learned value for the segment, or may be utilized to gradually adjust another map variable. In another method, the map variable may be coded with a particular starting point during development which is coded into an ROM. An adjusted map may then be held in a RAM. The adjusted map is developed over use in the particular vehicle, and modifies the fixed map.

In sum, the present invention maps the response of a window closure to correct for the actual system response in discrete timeframes. This provides a better expected response, and thus will reduce the number of "false" or "delayed" obstructions.

A preferred embodiment of this invention has been disclosed; however, a worker of ordinary skill in this art would recognize that modifications would come within the scope of this invention. For that reason, the following claims should be studied to determine the true scope and content of this invention.

What is claimed is:

1. A window control system comprising:
   a closure member;
   a motor for driving said closure member;
   a control for monitoring a characteristic of movement of said closure member; and
   said control being programmed to predict a value of said characteristic at each of a plurality of discrete segments, said predicted value being corrected based upon a monitored system response, and said monitored system response being utilized to map a correction from said predicted value for each of said discrete segments.

2. A system as set forth in claim 1, wherein said correction is made in units utilized to move away from a predicted value by a particular amount over each of said segments.

3. A control as set forth in claim 2, wherein said corrected units are stored as digital codes associated with each of said segments.

4. A method of identifying an obstruction in the path of a vehicle closure comprising the steps of:
   providing a vehicle closure movable through a closure path consisting of a plurality of discrete segments;
   predicting a value of a characteristic during movement of said closure through said closure path;
   reading an actual system response of said characteristic at each of said discrete segments, and mapping a correction value to said characteristic at each of said discrete segments based on said read characteristic;
   moving said closure and monitoring said characteristic; and
   identifying an obstruction during a segment by utilizing said correction value, and comparing at least said correction value to a monitored value to determine whether said monitored value exceeds a predetermined limit.

5. A method as set forth in claim 4, wherein said correction value is utilized to reach a predicted value for the characteristic over each of said discrete segments.

6. A method as set forth in claim 4, wherein said discrete segments are segments of movement of said closure path.

7. A method as set forth in claim 4, wherein correction values are stored as digital codes.

8. A method as set forth in claim 4, wherein a limit is spaced from a predicted value, and said correction values are utilized to adjust a predicted value over each said segment.

\* \* \* \* \*